US008282976B2

(12) United States Patent
Dörr et al.

(10) Patent No.: US 8,282,976 B2
(45) Date of Patent: Oct. 9, 2012

(54) MIXTURES CONTAINING COCOA

(75) Inventors: Tillmann Dörr, Hohen-Sülzen (DE);
Lutz Guderjahn, Offstein (DE); Jörg Kowalczyk, Eisenberg-Steinborn (DE)

(73) Assignee: Sudzucker Aktiengesellschaft Mannheim/Ochsenfurt, Mannheim (DE)

( * ) Notice: Subject to any disclaimer, the term of this patent is extended or adjusted under 35 U.S.C. 154(b) by 1079 days.

(21) Appl. No.: 11/632,581

(22) PCT Filed: Jul. 8, 2005

(86) PCT No.: PCT/EP2005/007389
§ 371 (c)(1),
(2), (4) Date: Jan. 17, 2007

(87) PCT Pub. No.: WO2006/007993
PCT Pub. Date: Jan. 26, 2006

(65) Prior Publication Data
US 2008/0075805 A1 Mar. 27, 2008

(30) Foreign Application Priority Data

Jul. 21, 2004 (DE) .................. 10 2004 035 373

(51) Int. Cl.
*A23L 2/39* (2006.01)
(52) U.S. Cl. ....................... 426/593; 426/548
(58) Field of Classification Search .......... 426/593, 426/548
See application file for complete search history.

(56) References Cited

U.S. PATENT DOCUMENTS

| 3,560,218 | A | * | 2/1971 | Whelan | 426/548 |
| 3,809,765 | A | * | 5/1974 | Bratland | 426/471 |
| 4,283,432 | A | * | 8/1981 | Mitchell et al. | 426/466 |
| 4,587,119 | A | * | 5/1986 | Bucke et al. | 424/48 |
| 4,619,833 | A | * | 10/1986 | Anderson | 426/548 |
| 4,963,382 | A | * | 10/1990 | Arena et al. | 426/548 |
| 4,973,486 | A | * | 11/1990 | Matsumoto et al. | 426/548 |
| 4,980,189 | A | * | 12/1990 | Keme et al. | 426/548 |
| 5,032,411 | A | * | 7/1991 | Stray-Gundersen | 426/74 |
| 5,114,723 | A | * | 5/1992 | Stray-Gundersen | 426/74 |
| 5,264,228 | A | * | 11/1993 | Pray et al. | 426/285 |
| 6,045,850 | A | * | 4/2000 | Kondou | 426/548 |
| 6,849,286 | B1 | * | 2/2005 | Bayerkohler et al. | 426/285 |
| 7,045,166 | B2 | * | 5/2006 | Silver | 426/658 |
| 7,553,509 | B2 | * | 6/2009 | Dorr et al. | 426/590 |
| 7,662,419 | B2 | * | 2/2010 | Ojima et al. | 426/548 |
| 2003/0180432 | A1 | | 9/2003 | Shimizu et al. | |
| 2003/0199728 | A1 | | 10/2003 | Kashimura et al. | |

FOREIGN PATENT DOCUMENTS

| CA | 2 253 143 | A1 | 5/2000 |
| EP | 0 317 917 | A2 | 5/1989 |
| EP | 0 390 438 | A1 | 10/1990 |
| EP | 0 809 939 | A1 | 12/1997 |
| EP | 0916266 | A1 | 5/1999 |
| EP | 1 568 285 | A1 | 11/2003 |
| EP | 1 393 637 | A1 | 3/2004 |
| JP | 62-91162 | | 4/1987 |
| JP | 63152950 | | 6/1988 |
| JP | 1-196258 | | 8/1989 |
| JP | 02-234651 | | 9/1990 |
| JP | 2-234651 | | 9/1990 |
| JP | 3-39100 | | 2/1991 |
| JP | 09-205991 | | 8/1997 |
| JP | 10-304824 | | 11/1998 |
| JP | 11-221061 | | 8/1999 |
| JP | 11-346656 | | 12/1999 |
| JP | 2000-116754 | | 4/2000 |
| JP | 2000-125767 | | 5/2000 |
| JP | 2000-139351 | | 5/2000 |
| JP | 2004-146294 | | 5/2004 |
| JP | 2005-536994 | | 12/2005 |
| WO | 93/02566 | | 2/1993 |

OTHER PUBLICATIONS

Hancock, B. 1998. Pharmaceutical Science & Technology Today 1(8)345.*
Donnelly, B. J. 1973. American Association of Cerel Chemists, Inc., 52:70-78.*
Mathlouthi, M. 2003. Food Chemistry 82:61.*
International Organization for Standarization. 1977. Surface active agents-Powders and granules-measurement of angle of repose ISO 4342-1977, pp. 1-3.*
Ritschel, W. A. & Bauer-Brandl, A. 2002. Die Tablette, Handbuch der Entwicklung, Herstellung und Qualitatssicherung, 2nd edition. Edition Cantor Verlag. Aulendorf, Germany. chapter 4, 4.8.9, pp. 358-363.*
Fuller R., J. Appl. Bacteriol, www.pubmed.gov, May 1989 66(5): 365-78 (Abstract).
English Translation of Japanese Office Action in parallel procedure in Japan.
Suzuki, Kazumasa, A Health-Oriented New Sweetener: "Palatinose" and Its Field of Utilization, Japan Food Science, vol. 24, May 1985, special issue, with English translation by Dr. B. Kubota-Müller.
English translation of Japanese Office Action for Japanese Patent Application 2007-521840, mailed Sep. 29, 2009.

* cited by examiner

*Primary Examiner* — Carolyn Paden
(74) *Attorney, Agent, or Firm* — Harness, Dickey & Pierce, P.L.C.

(57) ABSTRACT

The present invention relates to cocoa-containing powders with an isomaltulose fraction, in particular for producing instant ready-made beverages.

33 Claims, No Drawings

MIXTURES CONTAINING COCOA

CROSS-REFERENCE TO RELATED APPLICATIONS

This application is a 371 US National Stage of International Application No. PCT/EP2005/007389, filed Jul. 8, 2005. This application claims the benefit of German Application DE 10 2004 035 373.5, filed Jul. 21, 2004. The disclosure of the above applications are incorporated by reference.

The present invention relates to improved granulated or powdered cocoa-containing mixtures, in particular for use as instant cocoa beverage powders, containing at least one cocoa component, at least one, preferably several, additive(s), and at least 39 to 90% by weight isomaltulose, commercially available as the product PALATINOSE® ,as well as to the use of isomaltulose in powdered cocoa mixtures.

Cocoa-containing mixtures, in particular for the production of instant beverages, are known. It is common for such cocoa-containing beverage powders to be offered in dry, pourable form and to contain cocoa powder, at least one sweetening component, such as sucrose, glucose or maltodextrin, and various additives, such as lecithin serving as an emulsifying agent or vanillin serving as a flavoring. These powdered mixtures are subject to a multitude of requirements. Firstly, they are expected to be suitable for storage for as long as possible, in particular this means that they remain capable of being poured and dosed, and dry. Moreover, they should not loose their typical flavor and odor components even over extended periods of time. On the other hand, it is essential that mixtures of this type are highly soluble in milk or water and, after production of the finished beverage, form a balanced sweetness profile, attractive flavor and pleasant feeling in the mouth, i.e. pleasant organoleptics. And lastly, it is also essential for both the powder and the prepared beverages to be attractive to the consumer in terms of their color and color distribution and, in particular, comprise a homogeneous color profile. Consequently, there is a constant need for cocoa mixtures with improved pertinent properties for the production of finished beverages.

The naturally occurring (for example in honey) reducing disaccharide ketose, PALATINOSE®(6-O-α-D-glucopyranosyl-fructose; isomaltulose) is used mainly as starting material for the production of isomalt, a virtually equimolar mixture of the diastereomers, 6-O-α-D-glucopyranosyl-D-sorbitol (1,6-GPS) and 1-O-α-D-glucopyranosyl-D-mannitol (1,1-GPM). Owing to its low sweetening power and ensuing flavor, isomaltulose, when used as a sweetening agent in food, is used chiefly in combination with sugar substitutes and/or sweeteners. Isomaltulose is also used to some extent to cover the unpleasant taste of other foods. On account of its delayed degradation taking place no earlier than in the small bowels, isomaltulose is also used in specialized foods for athletes to maintain the oxidative metabolism.

The use of isomaltulose as a sweetening agent in combination with other sugar substitutes or sweeteners is described, for example, in WO 93/02566. WO 93/02566 describes chocolate products, in which sugar is completely or partially replaced by products such as inulin and fructooligosaccharides. In addition, the chocolate composition can contain sugar substitutes such as xylitol, isomalt and/or isomaltulose.

JP 1989-1174093 describes mixtures of substances for producing foods and baking goods that contains, for example, isomaltulose or reduced isomaltulose in combination with fructose. The mixture of substances can be used, for example, for producing milk products, chocolate, chewing gum, etc.

JP 02234651 A2 describes the production of anticariogenic foods and beverages, whereby a mixture of isomaltulose and isomaltulose-honey, a by-product of the production of isomaltulose, is used as a sweetening agent.

EP 390 438 B1 describes a sweetener mixture comprising sucralose and isomaltulose, whereby sucralose and isomaltulose show synergistic effects. The sweetener mixture can be used, for example, for producing beverages and confectionery.

JP 01196258 A2 describes beverages comprising caffeine-free tea/coffee, tryptophan- and/or valerian- and starch hydrolysates-containing milk powder. A caffeine-free instant coffee containing tryptophan, aspartame, and isomaltulose is described as an example.

JP 62091162 A describes aspartame-containing foods and beverages that may contain isomaltulose, if applicable.

The use of isomaltulose in foods and beverages to cover the unpleasant taste of certain food constituents is described, for example, in EP 0 809 939 A1. EP 0 809 939 A1 describes a lactic acid bacteria- and bifidobacteria-containing yoghurt that contains refined fish oil with a high proportion of unsaturated fatty acids and a sweetener, for example isomaltulose. The addition of isomaltulose is intended to prevent the typical fish taste and fish odor from developing.

JP 63152950 A2 describes the production of vegetable-jelly products through the use of vegetable species and a gelling agent, whereby isomaltulose and other additives, such as cinnamon, are used to cover the unpleasant smell of vegetable constituents.

The use of isomaltulose for maintaining oxidative metabolism is described, for example, in Japanese unexamined patent application, Hei 11 (2000)-116754, which relates to foods and beverages for athletes containing isomaltulose as saccharide. Isomaltulose is used in foods for athletes in particular in order to maintain oxidative metabolism.

Although both cocoa-containing mixtures for producing instant beverages and isomaltulose, as such, have been known for a long time, it is not known which composition an instant beverage powder for producing cocoa-containing beverages must have in order for it to be improved with respect to common sucrose-, glucose- or maltodextrin-based cocoa mixtures, in particular in that it provides improved shelf-life and/or improved pourability and dosability and/or reduced hygroscopicity and/or improved solubility in milk or, in the case of milk powder-containing formulations of the beverage powder, in water, whereby simultaneously a balanced sweetness profile, a homogeneous color profile, an attractive flavor, and a similar feeling in the mouth as with known, for example sucrose-based, products occurs.

The technical problem underlying the present invention is thus to provide an powdered cocoa mixture whose pertinent properties are improved, in particular for use as an instant cocoa beverage powder.

The present invention solves the technical problem underlying it by providing a granulated or powdered cocoa mixture containing 9 to 60% by weight (relative to the total dry weight of the cocoa mixture) of at least one cocoa component, 1 to 40% by weight (relative to the total dry weight of the cocoa mixture) of at least one additive, preferably several additives, and 20 to 90% by weight, preferably 20 to 50% by weight or 50 to 80% by weight, in particular 55 to 75% by weight (relative to the total dry weight of the cocoa mixture) isomaltulose.

Accordingly, the present invention solves the technical problem underlying it in particular by providing a granulated or powdered cocoa mixture comprising a certain proportion of isomaltulose.

According to the present invention, isomaltulose can be used according to the invention for producing non-clumping, pourable instant beverage powders in powdered or granulated form with increased shelf-life and low tendency to take up water. The instant beverage powders according to the invention can be dissolved rapidly and completely in water or milk even at low temperatures and thus yield tasty cocoa or chocolate beverages or cocoa- or chocolate-like beverages that are ready for consumption. Advantageously, isomaltulose can be produced from sucrose. Isomaltulose is produced from sucrose solutions that are either pure or obtained during sugar production, by transglucosidation of sucrose to form isomaltulose using viable or dead Protaminobacter rubrum cells or enzyme extracts prepared therefrom. Isomaltulose crystallizes in the form of a monohydrate. The solubility of isomaltulose in water is 0.49 g anhydrous isomaltulose per g of water.

Isomaltulose has advantageous acariogenic properties, since it is scarcely degraded by the human oral flora. Only the glucosidases of the human small bowel wall cleave isomaltulose with a delay and the resulting degradation products, glucose and fructose, are absorbed. Compared to rapidly digestible carbohydrates, this results in a slow increase of the blood glucose. Unlike rapidly digestible, high-glycemic foods, isomaltulose requires scarce amounts of insulin for its metabolism. Despite its favorable acariogenic properties, isomaltulose is scarcely used as a sole sugar or sole sweetening agent in foods or beverages which is in contrast to sugar substitutes, such as mannitol, sorbitol, and isomalt, or sweeteners, such as cyclamate. This is related mainly to the flavor of isomaltulose, in particular because of the substantially lower sweetening power as compared to sucrose. The sweetening power of 10% aqueous isomaltulose solutions is only approx. 0.4 the sweetening power of sugar. In addition, isomaltulose can form reversion and Maillard products.

In the context of the present invention, "instant beverage powders" according to the invention is taken to mean products for the food and sweetener industry that are rapidly and completely soluble in water or milk and are provided in particular in powdered, but also in granulated form. The instant beverage powders are produced, for example, by mixing, instantization or coagglomeration of cocoa powder, isomaltulose, and additives, if applicable, whereby in particular powdered, or granulated as may be the case, pourable products are obtained.

Accordingly, the cocoa mixtures according to the invention can be produced by means of simple mixing of the components, i.e. raw materials, for example in a Lodige mixer, by agglomeration or by means of instantization. The procedure according to the invention can provide, in particular, for comminution of the raw materials, in particular isomaltulose, in a first step, and subsequent mixing of the comminuted isomaltulose and further ingredients, in particular the cocoa component, and the additives. The comminution of the isomaltulose can be dispensable, if applicable. Another embodiment can provide for comminution of the raw materials, in particular isomaltulose, and subsequent transfer to an agglomeration, preferably in a fluidized solids procedure, whereby the comminuted isomaltulose is agglomerated jointly with the cocoa component and the additives or additive. The comminution of the isomaltulose can be dispensable, if applicable. Another embodiment can provide for comminution of the raw materials, in particular isomaltulose, and instantization with the additives and the cocoa powder under the influence of steam. The comminution of the isomaltulose can be dispensable, if applicable. The invention therefore also relates to cocoa mixtures produced by agglomeration, mixing and/or instantization of the components specified above. Obviously, it is also possible to subject the ingredients used in the cocoa mixture to a wet granulation followed by drying and formulation, in particular screening, in order to obtain powdered or granulated cocoa mixtures according to the invention.

The invention therefore provides for the use of isomaltulose as sweetening agent, in particular as the sole sugar present in the cocoa mixture, preferably as the sole body-providing sweetening agent, particularly preferably as the sole sweetening agent in the powdered cocoa mixture according to the invention, in particular instant cocoa beverage powder or granulate. In a preferred embodiment, the cocoa mixture according to the invention is lactose-free.

In the context of the present invention, the term, "sweetening agent", is taken to mean substances that possess sweetening power and are added, for example, to foods or beverages in order to produce a sweet flavor. In the context of the present invention, the "sweetening agents" shall be subdivided as "sugars", such as sucrose, glucose or fructose, that provide body and sweetening power, and as "sweetening means", i.e. substances that are not sugars but still possess sweetening power, with the latter being further subdivided as "sugar substitutes", i.e. sweetening agents possessing a body and a physiological caloric value in addition to their sweetening power (body-providing sweetening means), and as "intensive sweetening means", i.e. substances that usually have very high sweetening power, but no body and usually no or little physiological caloric value.

Accordingly, the invention provides a cocoa mixture, in particular in the form of a powder or a granulate, containing 9 to 60% by weight of at least one cocoa component, preferably 20 to 30% by weight (each relative to the total dry weight of the cocoa mixture) of a cocoa component and 1 to 40% by weight (relative to the total dry weight of the cocoa mixture) of at least one additive and 20 to 90% by weight, preferably 20 to 50% by weight or 50 to 80% by weight (each relative to the total dry weight of the cocoa mixture) isomaltulose. A particularly preferred embodiment provides for 55 to 75% by weight isomaltulose (relative to the total dry weight of the cocoa mixture) to be contained in the granulated or powdered cocoa mixture.

A preferred embodiment of the invention provides for the use of cocoa powder, in particular fat-depleted or oil-depleted cocoa powder, as the cocoa component.

In the context of the present invention, additives is taken to mean substances that can be added to the powdered or granulated cocoa mixture according to the invention in addition to isomaltulose and the cocoa component. Accordingly, the additives are substances that can be used optionally, and the invention thus relates to cocoa mixtures according to the invention comprising these substances or a selection thereof as well as cocoa mixtures not comprising any or all of the additives specified. The use of the additives can be decided individually on the basis of the application field and requirement profile of the markets and consumers at hand.

In the context of the present invention, an additive is taken to mean, for example, a prebiotic with an advantageously positive influence on the nutrition-physiological properties of the cocoa mixture, an intensive sweetening means, a sugar or a sugar substitute affecting the sweetening power of the cocoa mixture, a fat-containing component or a milk product influencing in particular the type and flavor of the beverage thus produced, or a supplement.

A supplement is taken to mean substances affecting, in particular, the appearance, flavor, organoleptic properties, nutritional value, nutrition-physiological properties, processability, shelf-life or readiness for use of the mixture.

A further preferred embodiment thus provides for the at least one additive to be provided as a prebiotic, preferably inulin, oligofructose or galactooligosaccharide.

In the context of the present invention, a prebiotic is taken to mean an additive that selectively stimulates the growth and/or activity of specific bacteria in the digestive tract of humans or animals, in particular bifido bacteria and/or lactobacilli such that health-promoting effects are to be expected or in fact occur.

In the context of the present invention, a "probiotic" is taken to mean a viable microbial additional component that promotes the health of the human or animal consuming it by stabilizing or improving the microbial composition of the digestive tract. Probiotic microorganisms of this type that can be used in foods, drugs or animal feeds, include, for example: Bifidobacterium including the strains B. adolescentis, B. animalis, B. bifidum, B. Iongum, B. thermophilum; Enterococcus; Lactobacillus including the strains Lb. acidophilus, Lb. brevis, Lb. casei, Lb. cellobiosus, Lb. crispatus, Lb. delbrueckii subsp. Bulgaricus, Lb. fermentum, Lb. GG, Lb. johnsonii, Lb. lactis, Lb. plantarum, Lb. reuteri, Lb. rhamnosus, Lb. salivarius; Bacillus cereus toyoi; Bacillus cereus; Leuconostoc; Pediococcus acidilactici; Propionibacterium; Streptococcus including the strains S. cremoris, S. infantarius, S. intermedius, S. lactis, S. salivarius subsp. thermophilus (see Fuller, J. Appl. Bacteriol. (1989)). Bacteria of the genera, Lactobacillus and Bifidobacterium, are preferred probiotics.

In the context of the present invention, "synbiotic" is taken to mean a mixture of at least one prebiotic and at least one probiotic that promotes the health of the human or animal consuming it by improving the survival rate and increasing the number of health-promoting viable microbial organisms in the gastrointestinal tract, in particular by selectively stimulating the growth and/or metabolic activity of the microbial organisms.

A further preferred embodiment provides the at least one additive to be provided in the form of a probiotic, preferably bifidobacteria or lactobacteria. Probiotic bacterial cultures of this type can preferably be provided in the form of dry cultures or continuous cultures. A further preferred embodiment provides for the use of synbiotics, i.e. mixtures of probiotics and prebiotics.

The invention also provides for the at least one additive to be provided in the form of a fat-containing component, for example cocoa mass, hardened or non-hardened plant fat or similar substance, for example as a fat substitute.

A further preferred embodiment of the invention provides for the at least one additive to be provided in the form of a milk product, in particular a lactose-free milk product, for example as skimmed milk powder, whole milk powder, lactose-free skimmed or whole milk powder, whey extract, whey product. In this embodiment, i.e. a cocoa mixture containing isomaltulose, a milk product, and a cocoa component, it is preferred to use the milk product at a fraction equal to 20 to 40% by weight (relative to the total weight of the cocoa mixture). Particularly the latter embodiment preferably provides for the use of isomaltulose at a fraction equal to 20 to 50% by weight (relative to the total weight of the cocoa mixture).

A further preferred embodiment provides for the at least one additive to be a sugar, for example sucrose, glucose, fructose, maltose, lactose or a mixture of two or more of these. The at least one additive can also be malt extract. However, in a particularly preferred embodiment according to the invention the powdered or granulated cocoa mixture of the present invention is, except for isomaltulose, free of sugar or free of lactose.

Obviously, an embodiment of the invention relates to cocoa mixtures according to the invention that contain sweetening means, for example sugar substitutes or intensive sweetening means, aside from their isomaltulose content of at least 20% by weight.

One embodiment of the invention provides for the sugar substitute to be, in particular, a sugar alcohol and to be selected particularly from the group consisting of isomalt, 1,1-GPM (1-O-α-D-glucopyranosyl-D-mannitol), 1,6-GPS (6-O-α-D-glucopyranosyl-D-sorbitol), 1,1-GPS (1-O-α-D-glucopyranosyl-D-sorbitol), maltodextrins, lactitol, maltitol, erythritol, xylitol, mannitol, sorbitol, maltitol syrup, hydrated and non-hydrated starch hydrolysates, and a mixture of two or more of these.

A further preferred embodiment provides for the intensive sweetening means to be selected from the group consisting of sucralose, sodium cyclamate, acesulfame K, neohesperidine-dihydrochalcone, glycyrrhicine, stevioside, monellin, thaumatin, aspartame, dulcin, saccharine, naringin-dihydrochalcone, neotame, and a mixture of two or more of these.

A particularly preferred embodiment of the invention provides for the at least one additive to be provided in the form of a supplement and to be selected from the group consisting of malt extract, aroma substances, food dyes, flavorings, minerals such as sodium or calcium, in particular salts such as sodium chloride, vitamins, folic acid, emulsifying agents, lecithin, dietary fibers, omega-3 fatty acids, medium chain length triglycerine, phytoestrogens, and ascorbic acid salts or combinations thereof. In a preferred embodiment, the cocoa mixture according to the invention contains, for example, vanillin as an aroma substance.

According to the invention, it is also provided that the instant beverage powders can also contain 0.1% by weight to 5% by weight salts of organic or inorganic acids. Preferably, salts such as NaCl, trisodiumcitrate or a phosphate such as $K_2HPO_4$ or $KH_2PO_4$ are used.

According to the invention it is also provided that the instant beverage powders according to the invention contain flow aids. A "flow aid" or "flow agent" is taken to mean so-called pouring aids which effect the free-flowing of powders that are, for example, sticky or come to a stop. Preferably, the free-flowing agent used according to the invention is silicon dioxide.

According to the invention, it is also provided that the instant beverage powders, in addition, can contain natural and/or synthetic dyes. The natural dyes can be, for example, dyes of plant origin, such as carotinoids, flavonoids and anthocyans, dyes of animal origin such as cochineal, inorganic pigments such as titanium dioxide, iron oxide pigments and iron hydroxide pigments. Secondarily formed dyes such as the products of enzymatic browning, for example polyphenols, and products of non-enzymatic browning, such as melanoidines, can be used as natural dyes. Moreover, the invention provides for heating products such as caramel and sugar coloring to be used as natural dyes. Moreover, synthetic dyes such as azo-, triphenylmethane, indigoid, xanthene, and quinoline compounds can be used as synthetic dyes for the instant beverage powders according to the invention. Preferably, the synthetic dyes used according to the invention are water soluble to a special degree.

According to the invention, the instant beverage powders according to the invention can, in addition, be fortified with natural or synthetic vitamins selected from the group consisting of vitamin A, vitamin $B_1$, vitamin $B_2$, vitamin $B_3$, vitamin $B_5$, vitamin $B_6$, vitamin $B_{12}$, vitamin B complex, vitamin C, vitamin D, vitamin E, vitamin F, and vitamin K. In addition, the instant beverage powders according to the invention can contain minerals and trace elements.

According to a particularly preferred embodiment of the invention the powdered or granulated cocoa mixture of the present invention can comprise not only one, but several additives, for example two, three, four, five, six or more additives. Accordingly, a typical cocoa mixture of the present invention comprises, aside from the isomaltulose used according to the invention and the cocoa component, in particular an emulsifying agent as supplement, for example lecithin, a mineral, for example sodium chloride, an aroma substance, for example vanillin, and an intensive sweetening means, for example sucralose. A further preferred embodiment can provide for the cocoa mixture according to the invention to comprise, aside from the cocoa component and isomaltulose, as an additive an emulsifying agent such as lecithin, a mineral such as sodium chloride, an aroma substance such as vanillin, an intensive sweetening means such as sucralose, and, in addition, a prebiotic, for example inulin, oligofructose and/or galactooligosaccharides.

A further preferred embodiment of the invention provides, in particular, a milk product, an emulsifying agent, for example lecithin, a mineral, for example sodium chloride, an aroma substance, for example vanillin, and an intensive sweetening means, for example sucralose to be present in an embodiment aside from the isomaltulose used according to the invention and the cocoa component. If applicable, a prebiotic and/or probiotic can be present in addition.

In a further preferred embodiment the cocoa mixture according to the present invention is a cocoa mixture containing malt extract, for example, an Ovomaltine based mixture whereby the saccharose normally present in Ovomaltine is partly or wholly replaced by isomaltulose. In a preferred embodiment, 10 to 30% by weight, preferably 20 to 30% by weight isomaltulose (referred to the total dry substance of Ovomaltine or cocoa mixture) is used in Ovomaltine. Ovomaltine is a mixture of condensed skimmed milk, malt extract, partly obtained directly from barley, whey powder, glucose syrup, low-fat cocoa, vegetable fat and oil, yeast, sodium chloride, mineral salts (calcium, magnesium, iron), possibly sweeteners acesulfam-K and aspartame, vitamins, aroma agents, vanillin, emulsifying agents monocerides and diglycerides, antioxidants ascorbyl palmitate and alphatocopherol. In a preferred embodiment according to the present invention, a cocoa mixture based on malt extract or "Ovomaltine" contains malt extract, in particular 20 to 50% by weight malt extract, isomaltulose (PALATINOSE®), preferably 10 to 30% by weight, in particular 20 to 30% by weight isomaltulose, skimmed milk powder, preferably 5 to 25% by weight skimmed mild powder, cocoa, preferably 5 to 20% by weight, in particular 9 to 20% by weight cocoa, whey powder, in particular 5 to 15% whey powder, and further ingredients, in particular 1 to 10% further ingredients (all values referred to the total dry substance of the cocoa mixture). Further ingredients preferably used in accordance with the present invention are, in particular, yeast, magnesium carbonate, calcium phosphate, oil, vitamins, salt and aroma agents.

A particularly preferred embodiment of the invention relates to a cocoa mixture, in which isomaltulose is the sole sugar present in the cocoa mixture, i.e. no other sugars are present. In a preferred embodiment of the present invention, the cocoa mixture according to the invention is free of lactose. A particularly preferred embodiment of the invention provides the isomaltulose to be the sole body-providing sweetening agent that is present in the cocoa mixture, i.e. that no sugars and no sugar alcohols or sugar substitutes are present. A further preferred embodiment provides the isomaltulose to be the sole sweetening agent that is present in the cocoa mixture, i.e. other than isomaltulose there are no sugars, no intensive sweetening means and no sugar substitutes or/and sugar alcohols present in the cocoa mixture.

Moreover, the invention relates to beverages produced by means of the powdered and granulated cocoa mixtures specified above, containing the cocoa mixture specified above and a solvent, for example water or milk.

The invention also relates to the use of isomaltulose in a powdered or granulated cocoa mixture, in particular in an instant beverage powder for the production of a cocoa beverage, in order to improve the shelf-life, pourability and/or dosability of the powdered or granulated cocoa mixture, in particular as compared to common sucrose-, glucose- or maltodextrin-based beverage powders.

Moreover, the invention relates to the use of isomaltulose in a powdered or granulated cocoa mixture, in particular in an instant beverage powder for the production of a cocoa beverage, in order to reduce the hygroscopicity of the powdered or granulated cocoa mixture, in particular as compared to common sucrose-, glucose- or maltodextrin-based beverage powders.

And lastly, the invention also relates to the use of isomaltulose in a powdered or granulated cocoa mixture, in particular in an instant beverage powder for the production of a cocoa beverage, in order to increase the solubility of the powdered or granulated cocoa mixture in milk or water, as the case may be, in particular as compared to common sucrose-, glucose- or maltodextrin-based beverage products.

A preferred further development of the invention provides for the use of the powdered or granulated cocoa mixtures according to the invention in pourable form for the production of instant beverages. However, the invention also provides for the mixtures according to the invention to be compressed and used as tablets or "beverage tabs" or in compressed form for the production of beverages either for dissolution in milk or, in the presence of, for example, milk powder in the cocoa mixture according to the invention, in water. The invention therefore also relates to compressed cocoa mixtures according to the present invention that were compressed by applying sufficient pressure for the production of tablets.

Further advantageous developments of the invention are evident from the dependent claims.

The invention shall be illustrated in more detail by means of the following examples.

EXAMPLES

Example 1

Production of Cocoa Beverages Containing Isomaltulose as the Sole Body-Providing Sweetening Agent Two different production processes were used to produce the cocoa mixtures according to the invention.
Production Processes
(1) Agglomeration (Fluidized Layer Granulation):
Isomaltulose is comminuted in a pinned disk mill at max. speed. For the subsequent agglomeration, the parameters were set as follows:
Pump setting:
inner tubing diameter: 1.7 mm, 89 rpm,
spraying pressure: 4.0 bar
spraying solution (emulsion):
270.0 g $H_2O$, 1.7% lecithin, 0.05% vanillin, 0.05% NaCl, if applicable, 0.03% sucralose.

The spray solution was heated to 60° C. and then agglomerated jointly with the comminuted isomaltulose and cocoa powder using a fluidized layer procedure.

(2) Production Using a Lödige Mixer

Isomaltulose is comminuted in a pinned disk mill at max. speed. For mixing of the ingredients, the parameters were set as follows:

Mixing time/spraying: 15 min.

spraying solution (emulsion):

270.0 g H$_2$O, 1.7% lecithin, 0.05% vanillin, 0.05% NaCl, if applicable, 0.03% sucralose.

The spray solution was heated to 60° C. and then mixed with the comminuted isomaltulose and cocoa powder. The product can be dried subsequently, if needed.

The following control formulas 3 and 4 were produced in analogous fashion.

TABLE 1

Formula 1 (experiment no. MS 213/2), (Agglomeration, fluidized layer granulation)

|   | Raw material | Fraction [%] |
|---|---|---|
| 1 | Isomaltulose | 73.17% |
| 2 | Cocoa powder | 25.0% |
| 3 | Lecithin | 1.7% |
| 4 | Salt NaCl | 0.05% |
| 5 | Vanillin | 0.05% |
| 6 | Sucralose | 0.03% |
| Total | | 100.00% |

TABLE 2

Formula 2 (experiment no. MS 213/3), (Lodige mixer)

|   | Raw material | Fraction [%] |
|---|---|---|
| 1 | Isomaltulose | 73.15% |
| 2 | Cocoa powder | 25.0% |
| 3 | Lecithin | 1.7% |
| 4 | Salt NaCl | 0.05% |
| 5 | Vanillin | 0.05% |
| 6 | Sucralose | 0.05% |
| Total | | 100.00% |

REFERENCE EXAMPLES

TABLE 3

Formula 3 (experiment no. MS 213/4), (Agglomeration, fluidized layer granulation)

| Raw material | Fraction [%] |
|---|---|
| Powdered sugar | 55.2% |
| Glucose | 23% |
| Cocoa powder | 20.0% |
| Lecithin | 1.7% |
| Salt NaCl | 0.05% |
| Vanillin | 0.05% |
| Total | 100.0% |

TABLE 4

Formula 4 (experiment no. MS 213/5), (Agglomeration, fluidized layer granulation)

| Raw material | Fraction [%] |
|---|---|
| Maltodextrin | 55.2% |
| Glucose | 23% |
| Cocoa powder | 20.0% |
| Lecithin | 1.7% |
| Salt NaCl | 0.05% |
| Vanillin | 0.05% |
| Total | 100.0% |

Example 2

Production of Cocoa Beverages Containing Isomaltulose-Inulin as the Body-Providing Sweetening Means and as Prebiotic (5) Agglomeration (Fluidized Layer Granulation)

Isomaltulose is comminuted in a pinned disk mill at max. speed. For the agglomeration, the parameters were set as follows:

Pump setting:

inner tubing diameter 1.7 mm, 89 rpm, spraying pressure: 4.0 bar spraying solution (emulsion):

270.0 g H$_2$O, 1.7% lecithin, 0.05% vanillin, 0.05% NaCl, if applicable, 0.03% sucralose.

The spray solution was heated to 60° C. and then agglomerated jointly with the comminuted isomaltulose, inulin, and cocoa powder using a fluidized layer procedure.

(6) Production Using a Lödige mixer:

Isomaltulose is comminuted in a pinned disk mill at max. speed. For mixing of the ingredients, the parameters were set as follows:

Mixing time/spraying: 15 min.

spraying solution (emulsion):

270.0 g H$_2$O, 1.7% lecithin, 0.05 vanillin, 0.05 NaCl, if applicable, 0.03% sucralose.

The spray solution was heated to 60° C. and then mixed with the comminuted isomaltulose, inulin, and cocoa powder. The product can be dried subsequently, if needed.

TABLE 5

Formula 5 (Agglomeration, fluidized layer granulation)

| Raw material | Fraction [%] |
|---|---|
| Isomaltulose | 50% |
| Inulin ST | 23.17% |
| Cocoa powder | 25.0% |
| Lecithin | 1.7% |
| Salt NaCl | 0.05% |
| Vanillin | 0.05% |
| Sucralose | 0.03% |
| Total | 100.00% |

TABLE 6

Formula 6 (Lodige mixer)

| Raw material | Fraction [%] |
|---|---|
| Isomaltulose | 50% |
| Inulin HP | 23.17% |

TABLE 6-continued

Formula 6 (Lodige mixer)

| Raw material | Fraction [%] |
|---|---|
| Cocoa powder | 25.0% |
| Lecithin | 1.7% |
| Salt NaCl | 0.05% |
| Vanillin | 0.05% |
| Sucralose | 0.03% |
| Total | 100.00% |

Example 3

Formulas 1 to 6 were then dissolved in cold milk as usual (10 g in 125 ml of milk) and the overall flavor profile and subjective sweetness attained were assessed by a panel of subjects. The results of the assessment are shown in the following table 7. Moreover, storage tests in stress mode (25° C., 80% relative humidity, 1 day) were carried out and the angle of repose was determined in order to determine the flow properties in accordance with "Die Tablette, Handbuch der Entwicklung, Herstellung und Qualitätssicherung, W. A. Ritschel, A. Bauer-Brandl, chapter 4/4.8.9, page 361, 2nd edition 2002".

After the storage test, the products, 1, 2, 5 (product 5 only to a limited degree) and 6 could be dosed well, whereas the products 3 and 4 were clumped. To characterize the flow properties of the cocoa mixture, the angles of repose were determined and it was found that products 1, 2, 5, and 6 are particularly well suited for automatic dosing due to their better flow properties (lower angle of repose of 30 to 35°).

TABLE 7

| Product characteristics | 1 | 2 | 3 | 4 | 5 | 6 |
|---|---|---|---|---|---|---|
| Overall sensory impression | + | + | − | − | + | + |
| Subjective sweetness | + | + | − | − | + | + |
| Flow properties | + | + | ± | − | + | + |
| Storage properties | + | + | − | − | ± | + |

Legend:
+: positive assessment (depending on characteristic assessed: pleasant "round" and harmonious flavor; comparatively pleasant sweetness that is not too intensive; lower angle of repose (30 to 35°); no clumping)
−: negative assessment (depending on characteristic assessed: less pleasant flavor, especially overly sweet flavor; comparatively too intensively sweet (overly sweet); higher angle of repose (exceeding 35°); clumping)
±: limited positive assessment

The invention claimed is:

1. Powdered or granulated cocoa mixture containing 9 to 60% by weight (relative to the total weight of the cocoa mixture) of at least one cocoa component, 1 to 40% by weight (relative to the total weight of the cocoa mixture) of at least one additive, and 20 to 90% by weight (relative to the total weight of the cocoa mixture) isomaltulose;
wherein the cocoa mixture has an angle of repose between about 30° and about 35° after being subjected to a storage test in stress made for one day at 25° C. and 80% relative humidity.

2. Cocoa mixture according to claim 1, wherein the cocoa mixture is an instant cocoa beverage powder.

3. Cocoa mixture according to claim 1, wherein the at least one additive is a prebiotic, a probiotic, a supplement, a fat-containing component and/or a milk product.

4. Cocoa mixture according to claim 3, wherein inulin, oligofructose and/or galactooligosaccharides is/are the prebiotic.

5. Cocoa mixture according to claim 1, further comprising an intensive sweetening means.

6. Cocoa mixture according to claim 1, wherein the at least one additive is a milk product, in particular a lactose-free milk product.

7. Cocoa mixture according to claim 6, wherein the milk product is skimmed milk powder, whole milk powder, lactose-free skimmed milk powder, lactose-free whole milk powder, a whey product or a mixture of two or more of these.

8. Cocoa mixture according to claim 1, wherein the at least one additive is a supplement and is selected from the group consisting of malt extract, aroma substances, dyes, flavorings, flow aids, minerals such as sodium and calcium, in particular salts such as sodium chloride, vitamins, folic acid, emulsifying agents, dietary fibers, lecithin, omega-3 fatty acids, medium chain length triglycerides, phytoestrogens, and ascorbic acid salts.

9. Cocoa mixture according to claim 8, wherein vanillin is the aroma substance.

10. Cocoa mixture according to claim 1, wherein the isomaltulose is the sole sugar present in the cocoa mixture.

11. Cocoa mixture according to claim 1, wherein the isomaltulose is the sole sweetening agent present in the cocoa mixture.

12. Cocoa mixture according to claim 1, wherein cocoa powder is the cocoa component.

13. Cocoa mixture according to claim 1, wherein the cocoa mixture contains 20 to 30% by weight (relative to the total dry weight of the cocoa mixture) cocoa powder.

14. Cocoa mixture according to claim 1, wherein the cocoa mixture contains 50 to 70% by weight (relative to the total dry weight of the cocoa mixture) isomaltulose.

15. Cocoa mixture according to claim 1, wherein the cocoa mixture contains 20 to 30% by weight (relative to the total dry weight of the cocoa mixture) cocoa powder, 1 to 30% by weight (relative to the total dry weight of the cocoa mixture) of at least one additive, and 50 to 75% by weight (relative to the total dry weight of the cocoa mixture) isomaltulose.

16. Cocoa mixture according to claim 1, wherein several additives are present, namely a prebiotic, in particular inulin, an emulsifying agent, in particular lecithin, a salt, in particular sodium chloride, an aroma substance, in particular vanillin, and an intensive sweetening means, in particular sucralose.

17. Cocoa mixture according to claim 1, wherein several additives are present, namely an emulsifying agent, in particular lecithin, a salt, namely sodium chloride, an aroma substance, in particular vanillin, and an intensive sweetening means, in particular sucralose.

18. Compressed form of a cocoa mixture, produced by compressing a powdered or granulated cocoa mixture according to claim 1.

19. Beverage, produced from and containing a cocoa mixture according to claim 1, and a solvent.

20. Beverage according to claim 19, whereby water or milk is the solvent.

21. Cocoa mixture of claim 1, wherein the cocoa component is oil-depleted cocoa powder.

22. The method of making powdered or granulated cocoa mixture for producing a cocoa beverage of claim 1, wherein the isomaltulose is the sole body providing sweetening agent present in the cocoa mixture.

23. Powdered or granulated cocoa mixture containing 9 to 60% by weight (relative to the total weight of the cocoa mixture) of at least one cocoa component, 1 to 40% by weight (relative to the total weight of the cocoa mixture) of at least one additive, and 20 to 90% by weight (relative to the total weight of the cocoa mixture) isomaltulose;

wherein the at least one additive is a probiotic; and wherein lactobacilli or bifidobacteria is the probiotic.

24. A powdered or granulated cocoa mixture for producing a cocoa beverage, the cocoa mixture comprising:

at least one cocoa component; and isomaltulose;

wherein the isomaltulose is at least 20% by weight relative to the total weight of the cocoa mixture and improves the pourability and dosability of the powdered or granulated cocoa mixture, so that the cocoa mixture having enhanced pourability has an angle of repose between about 30° and about 35°.

25. The cocoa mixture according to claim 24, wherein the isomaltulose is present at a fraction equal to 20 to 90% by weight (relative to the total dry weight of the cocoa mixture) of the cocoa mixtures.

26. The cocoa mixture according to claim 24, wherein the isomaltulose is the sole sugar present in the cocoa mixture.

27. The cocoa mixture of claim 24, wherein the isomaltulose is the sole sweetening agent in the cocoa mixture.

28. The method of making powdered or granulated cocoa mixture for producing a cocoa beverage of claim 24, wherein the isomaltulose is the sole body-providing sweetening agent present in the cocoa mixture.

29. A powdered or granulated cocoa mixture for producing a cocoa beverage, the cocoa mixture comprising:

at least one cocoa component; and isomaltulose;

wherein the isomaltulose is at least 20% by weight relative to the total weight relative to the total weight of the cocoa mixture and the isomaltulose reduces the hygroscopicity of the powdered or granulated cocoa mixture at about 25° C. and about 80% relative humidity for about 24 hours as compared to sucrose-based cocoa mixtures lacking isomaltulose, glucose-based cocoa mixtures lacking isomaltulose and maltodextrin-based cocoa mixtures lacking isomaltulose.

30. The method of making powdered or granulated cocoa mixture for producing a cocoa beverage of claim 29, wherein the isomaltulose is the sole body-providing sweetening agent present in the cocoa mixture.

31. A method of making powdered or granulated cocoa mixture with improved pourability for producing a cocoa beverage, the method comprising:

providing at least one cocoa component; and adding isomaltulose, wherein the isomaltulose is at least 20% by weight relative to the total weight of the cocoa mixture;

wherein the step of adding isomaltulose includes improving the pourability and dosability of the powdered or granulated cocoa mixture, so that the cocoa mixture having enhanced pourability has an angle of repose between about 30° and about 35°.

32. The method of making powdered or granulated cocoa mixture for producing a cocoa beverage of claim 31, wherein the at least one cocoa component is 9 to 60% by weight (relative to the total weight of the cocoa mixture), the isomaltulose present at 20 to 90% by weight (relative to the total weight of the cocoa mixture) and further comprising at least one additive at 1 to 40% by weight (relative to the total weight of the cocoa mixture).

33. A method of making powdered or granulated cocoa mixture for producing a cocoa beverage, the method comprising:

providing at least one cocoa component; and adding isomaltulose, wherein the isomaltulose is at least 20% by weight relative to the total weight of the cocoa mixture;

wherein the step of adding isomaltulose includes reducing the hygroscopicity of the powdered or granulated cocoa mixture at about 25° C. and about 80% relative humidity for about 24 hours as compared to sucrose-based cocoa mixtures lacking isomaltulose, glucose-based cocoa mixtures lacking isomaltulose and maltodextrin-based cocoa mixtures lacking isomaltulose.

* * * * *

UNITED STATES PATENT AND TRADEMARK OFFICE
CERTIFICATE OF CORRECTION

| | | |
|---|---|---|
| PATENT NO. | : 8,282,976 B2 | Page 1 of 1 |
| APPLICATION NO. | : 11/632581 | |
| DATED | : October 9, 2012 | |
| INVENTOR(S) | : Dorr et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this
Twelfth Day of August, 2014

Michelle K. Lee
*Deputy Director of the United States Patent and Trademark Office*